May 29, 1928.  1,671,606
E. F. PIERCE
FILTER
Filed Aug. 7, 1922   2 Sheets-Sheet 2

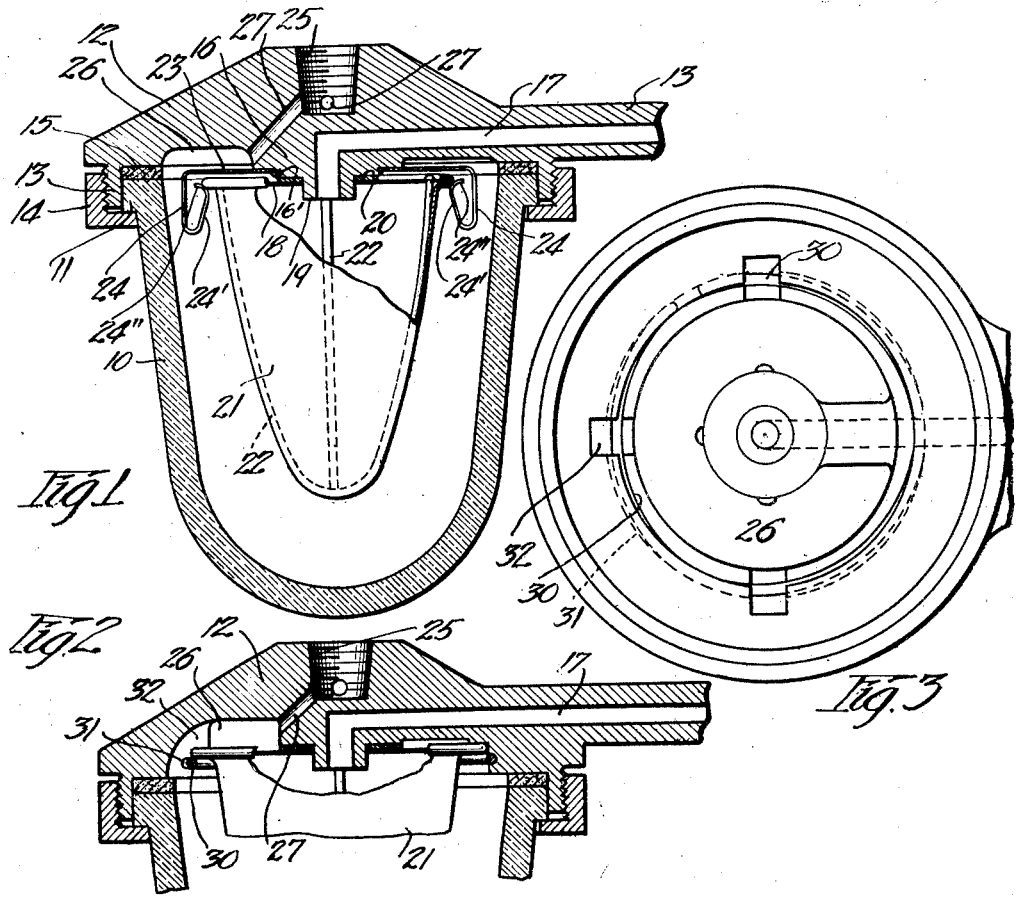

Inventor
Earl F. Pierce

Patented May 29, 1928.

1,671,606

UNITED STATES PATENT OFFICE.

EARL F. PIERCE, OF CHICAGO, ILLINOIS, ASSIGNOR TO THE BASSICK MANUFACTURING COMPANY, OF CHICAGO, ILLINOIS, A CORPORATION OF DELAWARE.

FILTER.

Application filed August 7, 1922. Serial No. 580,052.

My invention relates to improvements in filters, and is particularly concerned with improvements in filters to be used on automobiles for straining the gasoline, or other fuel, before it enters the vacuum tank carbureter, etc.

The objects of my invention are:

First: To provide a filter preferably of the visible type, comprising the supporting member, a filter element carried by said supporting member, and a filter receptacle removably secured to the supporting member so that it can be easily and quickly removed without disturbing the filtering element.

Second: To provide a filter comprising a filter element formed of fabric, or other flexible material, and means carried by the supporting member of the filter for holding the filter element in distended relation, and Third: To provide a filter of the character described which is simple in construction, and economical to manufacture.

Other objects of my invention will appear as this description progresses, reference being had to the accompanying drawings, in which Figure 1 is a central longitudinal section through one embodiment of my invention, portions of the device being broken away;

Figure 2 is a view similar to Figure 1, showing a different form of my invention;

Figure 3 is a bottom view of the form of my invention shown in Figure 2 with the bowl or receptacle and the filter element removed.

Throughout the several views, similar reference characters will be used for referring to similar parts.

Figure 4:
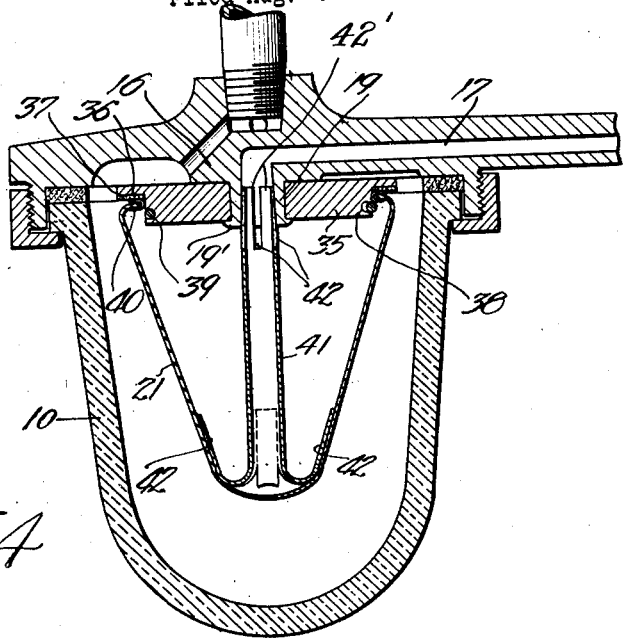
Figures 4 and 5 are central longitudinal sections showing still different embodiments of my invention.

In the embodiment of my invention which I have illustrated in Figure 1, I have shown a filter receptacle 10, which is preferably formed of glass and is more or less cup-shaped, the open end of which is provided with an outwardly extending flange 11. The open end of the receptacle 10 is closed by a cap 12, which is carried by an integrally formed supporting member 13, which will be described more in detail in connection with the description of Figure 6. This cap is provided with a downwardly extending annular flange 13', which is exteriorly threaded and which co-acts with the threaded sleeve 14 to removably secure the cap 12 to the receptacle 10. To prevent leakage between the cap and the receptacle, I prefer to interpose the gasket 15 between these two members. This gasket is preferably made of cork.

The cap 12 has an inwardly extending boss 16, through which, and the supporting member 13, an outlet duct 17 extends.

The filtering element of this embodiment of my invention comprises an imperforate disk 18, having a central opening for receiving the tubular extension 19 of the boss 16. A gasket 20 is interposed between the disk 18 and the adjacent face of the boss 16 to prevent leakage between these two members.

The open end of a bag 21, preferably formed of chamois or some other similar fabric, is secured to the outer edge of the disk 18, and held in distended relation by spring bows 22, the ends of which are riveted or otherwise secured to the disk 18 adjacent the edge thereof.

For securing the filter element to the cap, I provide a disk 23 which is centrally apertured for receiving the boss 16, the end of which is swaged over as shown at 16' to hold the disk 23 in position. The disk 23 is provided with a plurality of spaced outwardly extending arms 24, which are bent downwardly adjacent the edge of the disk 23, and then bent inwardly and back upon themselves to form the spring catches 24'. To secure one of the filter elements, it is merely necessary to bring the opening in the center of the disk 18 into registry with the projection 19, and to then push the disk upwardly whereupon the catches 24' will spring outwardly until the filter element has been properly positioned, when they will again spring inwardly, whereupon the outwardly curved portions 24" will yieldingly hold the filter element against the gasket 18. To remove the filter element, it is merely necessary to grasp its outer end and pull downwardly, thus forcing the catches 24' outwardly and releasing the filter element.

An internally threaded opening 25 extends inwardly from the top side of the cap 12 in substantially co-axial alignment with the inner end of the outlet duct 17, and communicates with a recessed chamber 26 formed in the lower side of the cap 12, through a plurality of bores 27. The chamber 26 in turn communicates with the space between the filter chamber 10 and the filter element 21.

In the use of my improved filter, the gasoline enters through the opening 25, the bores 27, chamber 26 and flows downwardly into the filter receptacle 10. The fuel percolates through the filter element, and passes out through the duct 17. Dirt, water, and other sediment is retained in the receptacle 10 by the action of the filter element, and collects in the bottom of this receptacle. From time to time, the receptacle 10 may be removed from the cap 12, and the contents thereof thrown away, whereupon the receptacle 10 can be replaced, and the filter is again in condition for operation. If, for any reason, it becomes necessary to replace the filter element, this can be easily and quickly accomplished by first removing the receptacle 10, and then substituting a new filter element for the old one in the manner described above. It will be clear from the above description that the receptacle 10 can be removed at any time without in any way disturbing the filter element 21.

The construction shown in Figures 2 and 3 is substantially like that illustrated in Figure 1, except that the filter element is held in place by means of a split spring ring 30, which is confined in the groove 31 in the outer wall of the chamber 26, and which is so formed as to spring beneath the edge of the filter element when the latter is pushed upwardly toward the cap 12. At intervals, vertically extending grooves 32 are formed in the wall of the chamber 26 to provide passages for establishing communication between this chamber and the filter receptacle.

In the embodiment of my invention shown in Figure 4, the boss 16 comprises a disk-like enlargement 35, secured thereto by swaging the outer end 19' of the extension or projection 19 outwardly over the disk 35. The outer edge of the disk 35 is shouldered as shown at 36 for supporting the gasket 37, and the portion of reduced diameter has a groove 38 formed therein for receiving the split spring ring 39, which is formed to spring outwardly beneath the ring 40, to which the open end of the fabric filter element 21 is secured.

For holding the filter element 21 in distended relation, I provide the tube 41, the upper end of which is slotted as shown at 42, and driven into the inner end of the outlet duct 17. The lower end of the tube 41 is preferably made of spring material and is longitudinally split at spaced intervals to form tongues 42' which are bent outwardly and then back upon the tube to provide means for yieldingly engaging the adjacent portions of the filter element 21, and thus to a certain extent determine the shape of the filter element. When the ring 40 is held in position by means of the split ring 39, as shown in Figure 4, the tongues 42' will cause the filter element to assume the form shown in this figure. The gasoline passing from the filter receptacle 10 through the filter element can pass outwardly either through the bottom of the tube 41, or through the lower ends of the slots 42, and then through the duct 17.

Figure 5:
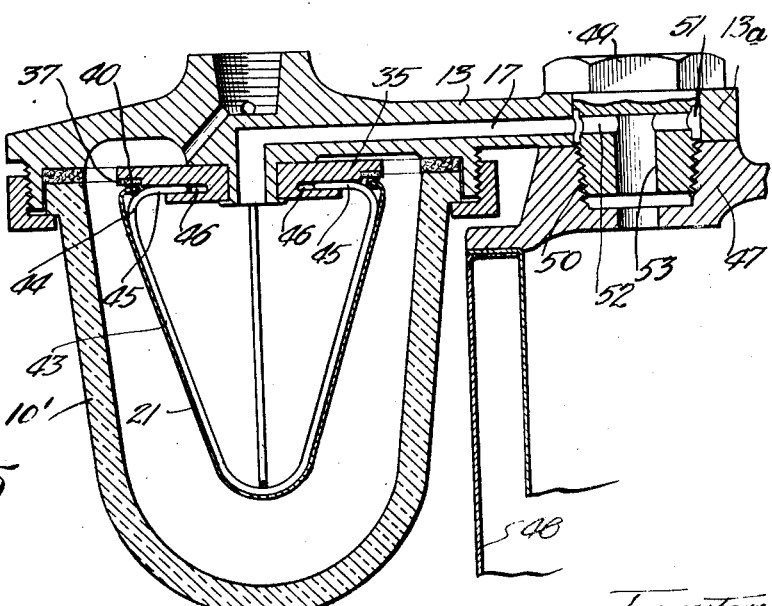

The construction shown in Figure 5 differs somewhat from that of Figure 4, in that here I provide a plurality of spring bows 43, which may be made of brass or other suitable material, preferably in the form of wires. These bows are so conformed as to give the fabric filter element 21 the desired shape, and their upper ends are curved inwardly, as shown at 44, to provide cam surfaces for camming the ring 40 of the filter element into sealing contact with the gasket 37, and end in horizontally extending portions 45. The ends of each bow are slidably mounted in suitable bores 46, extending inwardly from the outer edge of the disk 35. To secure a filter element in position in this form of my filter, the ring 40 is merely urged upwardly around the bows 43 until it causes the upper ends of these bows to move inwardly sufficient to pass by the initial portion of the curved portions 44, whereupon the bows 43 will spring outwardly and cam the ring 40 into sealing contact with the gasket 37.

In this form of my invention, as well as the embodiment previously described, I contemplate providing the outer end of the supporting member 13 with an eye 13ª, the bore of which communicates with the outlet duct 17. This eye is secured to the upper end 47 of the vacuum tank 48 by means of a plug or fitting 49, which is externally threaded to be received by the internally threaded inlet bore 50 of the vacuum tank. The fitting 49 has an annular groove 51, which communicates with the duct 17, and the radially extending bores 52 which establish communication between the groove 51 and the central bore 53 of the fitting 49, thus providing a passageway for the flow of fuel from the filter to the vacuum tank.

While I have described the details of the preferred embodiment of my invention, it is to be clearly understood that my invention is not limited to these details, but is capable of other adaptations and modifications within the scope of the appended claims.

Having thus described my invention, what I claim is:

1. A filter comprising a filter receptacle, a cap removably secured to the open end of said filter receptacle, said cap having an inwardly projecting boss, said boss having an outlet duct extending therethrough, a disc secured to said boss and a plurality of pairs of oppositely disposed bores extending inwardly from the sides of said disc, a plurality of spring bows each having its ends slidable in one of said pairs of bores, and a bag-shaped filter element held in distended relation by said bows and having a ring at its open end yieldingly held in sealed contact with the bottom of said boss by said bows, said cap having an inlet duct communicating with the space between said filter element and said receptacle.

2. A filter comprising a filter receptacle, a cap removably secured to the open end of said filter receptacle, said cap having an inwardly projecting boss, said boss having an outlet duct extending therethrough, a plurality of spring elements supported by said cap, and a bag-shaped filter element held in distended relation by said spring elements and having a ring at its open end held in sealed contact with the bottom of said boss, said cap having an inlet duct communicating with the space between said filter element and said receptacle.

3. A filter comprising a filter receptacle, a cap removably secured to said filter receptacle, said cap having a duct communicating with said filter receptacle, a filter element enclosing the end of said duct, and removably secured to said cap, and radially expanding means secured to said cap for holding said filter in distended relation, said filter being removable from said last-named means, said cap having an inlet duct communicating with the space between said filter element and said filter receptacle.

4. A filter comprising a receptacle, a cap for said receptacle, a filter element, and spring means that tends to expand radially for removably securing said element to said cap, said cap having an inlet duct and an outlet duct respectively communicating with opposite sides of said filter element.

5. A filter comprising a receptacle, a cap for said receptacle having a downwardly directed boss provided with an outlet opening, said cap having an inlet opening communicating with said receptacle, a filter element having means surrounding said boss for forming a separable joint therewith, and spring means that tends to expand radially for yieldingly holding said filter element in sealed relation with said boss.

6. A filter comprising a receptacle, a cap for said receptacle, said cap having a downwardly directed boss, a filter element, and spring means that tends to expand radially for yieldingly holding said element in contact with said boss, said cap having an inlet duct and an outlet duct respectively connected with opposite sides of said filter element.

In witness whereof, I hereunto subscribe my name this 29 day of July, 1922.

EARL F. PIERCE.